United States Patent [19]
Dobosz

[11] Patent Number: 4,875,431
[45] Date of Patent: Oct. 24, 1989

[54] WIND DEFLECTOR

[75] Inventor: Ronald F. Dobosz, 8710 Washington St., Omaha, Nebr. 68127

[73] Assignees: John R. Boro; Ronald F. Dobosz, both of Omaha, Nebr.

[21] Appl. No.: 237,235

[22] Filed: Aug. 26, 1988

[51] Int. Cl.$^4$ .............................................. G09F 17/00
[52] U.S. Cl. .................................. 116/173; 116/28 R
[58] Field of Search .................... 24/3 K, 460, 462; 40/591, 592, 607, 658, 666; 116/28 R, 173, 174, 175

[56] References Cited

U.S. PATENT DOCUMENTS

| | | | |
|---|---|---|---|
| 437,480 | 9/1890 | Chase | 40/607 |
| 1,871,690 | 8/1932 | Hogan | 40/607 |
| 2,329,046 | 9/1943 | Halbig | 116/28 R |
| 2,527,357 | 10/1950 | Donahey | 116/174 |
| 2,909,147 | 10/1959 | Crowder | 116/173 |
| 3,530,607 | 9/1970 | Willis | 40/591 |

Primary Examiner—William A. Cuchlinski, Jr.
Assistant Examiner—W. Morris Worth
Attorney, Agent, or Firm—Zarley, McKee, Thomte, Voorhees & Sease

[57] ABSTRACT

A wind deflection device includes a vertically-oriented elongated body having diverging side walls. In one embodiment of the invention, a plurality of brackets are mounted between the diverging side walls and have apertures which will snap onto and grip a vertically-oriented vehicle aerial. In a second embodiment of the invention, a continuous longitudinal bracket of a rubber-like material is utilized, which has a longitudinal slot will snap onto and grip the vehicle aerial. The brackets in both embodiments of the invention are designed to grip that portion of a pennant which is wrapped around the vehicle aerial. A third emodiment of the invention utilizes a bust-like configuration mounted on the forward side of the wind deflector, which is designed to represent a mascot of a collegiant or professional sports team.

4 Claims, 1 Drawing Sheet

WIND DEFLECTOR

TECHNICAL FIELD OF THE INVENTION

This invention relates generally to devices for deflecting wind, and more particularly to a wind deflector which is attachable to a vertical rod.

BACKGROUND OF THE INVENTION

Pennants have long been utilized as novelty items to indicate allegiance to various colleges and professional sporting teams. More recently, pennants have been designed for use on vehicle antennas, which will flap in the wind as the vehicle moves down the road.

One of the major problems associated with the use of pennants attached to vehicle aerials, is the shredding which occurs by the severe flapping as the vehicle moves along the road. Yet another problem is in the fact that such pennants are typically not easily adjusted on the aerial or removed therefrom.

It is therefore a general object of the present invention to provide a wind deflection device for reducing the action of wind on a pennant on a vehicle aerial.

Yet another object is to provide a wind deflector which is easily removable from the vehicle aerial.

A further object of the present invention is to provide a wind deflector which will assist in removably attaching a pennant to a vehicle aerial.

Still another object is to provide a wind deflector which provides a location for advertising of the purchaser's allegiance to a college, professional team, or the like.

Yet another object of the present invention is to provide a wind deflector which is economical to manufacture and refined in appearance.

These and other objects of the present invention will be apparent to those skilled in the art.

SUMMARY OF THE INVENTION

The wind deflection device of the present invention includes a vertically-oriented elongated body having diverging side walls. In one embodiment of the invention, a plurality of brackets are mounted between the diverging side walls, the bracket having apertures which will snap onto and grip a vertically-oriented vehicle aerial. In a second embodiment of the invention, a continuous longitudinal bracket of a rubber-like material is utilized, which has a longitudinal slot that will snap onto and grip the vehicle aerial. The brackets in both embodiments of the invention are designed to grip that portion of a pennant which is wrapped around the vehicle aerial. Thus, the wind deflector can also serve to adjustably fasten a pennant to the aerial. A third embodiment of the invention utilizes a bust-like configuration mounted on the forward side of the wind deflector, which is designed to represent a mascot of a collegiant or professional sports team, or the like.

DESCRIPTION OF THE PREFERRED EMBODIMENT

Figure 1:
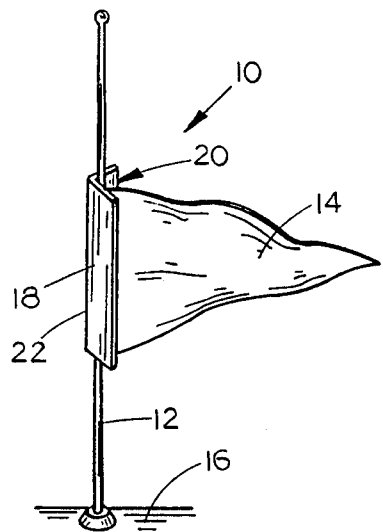
FIG. 1 is a perspective view of the present invention mounted on a vehicle aerial.

Referring now to the drawings, in which similar or corresponding parts are identified with the same reference numeral, and more particularly to FIG. 1, the wind deflector of this invention is identified generally at 10 and is mounted on a vehicle aerial 12 with a pennant 14 attached thereto. Aerial 2 is generally cylindrical, and extends vertically upward from a vehicle 16.

Figure 2:
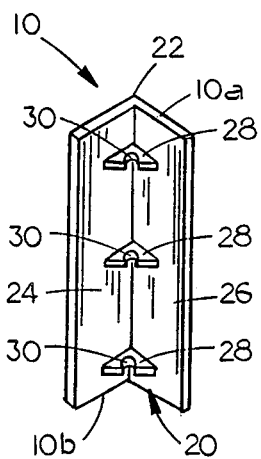
FIG. 2 is a perspective view of the wind deflector of this invention.

As shown in FIGS. 1 and 2, wind deflector 10 is an elongated member having a forward side 18 and a rearward side 20. Forward side 18 has a vertically extending forward most portion 22 with side walls 24 and 26 diverging in the horizontal direction therefrom. Diverging walls 24 and 26 serve to deflect wind away from the interior of the rearward side 20 of wind deflector 10.

A series of brackets 28 are mounted between diverging walls 24 and 26 on rearward side 20 of wind deflector 10, as shown in FIG. 2. Brackets 28 are spaced from upper end 10a to lower end 10b along wind deflector 10. Each bracket 28 includes an aperture 30 therein which is pen along one edge to allow aerial 12 to be snapped therein. Brackets 28 are comprised of a material which is generally resilient and which will allow a snap fit onto aerial 12.

Figure 3:
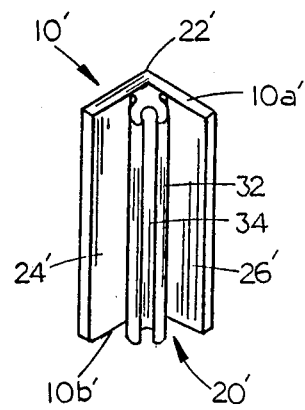
FIG. 3 is a perspective view of a second embodiment of the wind deflector.
Figure 4:
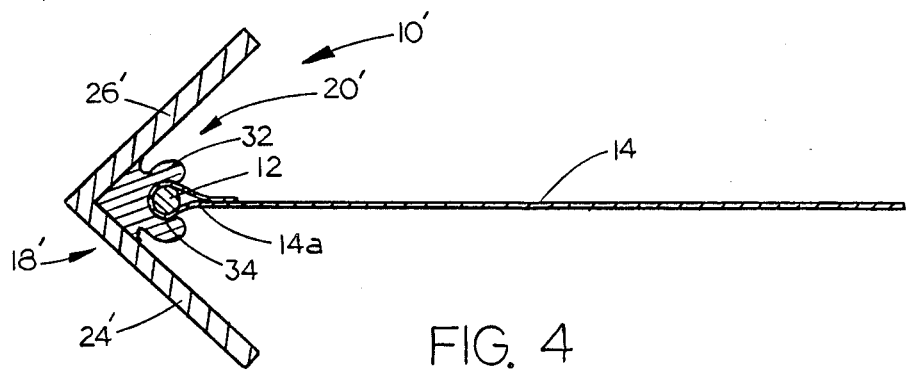
FIG. 4 is a downwardly directed sectional view of the embodiment of the invention shown in FIG. 3.

Referring now to FIGS. 3 and 4, a second embodiment of the wind deflector is designated generally at 10' and includes a forward-most portion 22', diverging walls 24' and 26', a forward side 18' and a rearward side 20'. Wind deflector 10' is provided with a resilient, flexible bracket 32 which extends from upper end 10a' to lower end 10b', as shown in the drawings. Bracket 32 is preferably of a resilient rubber material and includes a longitudinal slot 34 extending from end to end and having a generally cylindrical shape which will snap-fit onto aerial 12.

FIG. 4 shows that pennant 14 has a forward end 14a wrapped around aerial 12 to form a loop. Pennant 14 may be held in place utilizing bracket 32 by snapping the slot portion 34 over aerial 12 with end 14a of pennant 14 therebetween. Pennant 14 may also be fastened in place independently of wind deflector 10'.

Figure 5:
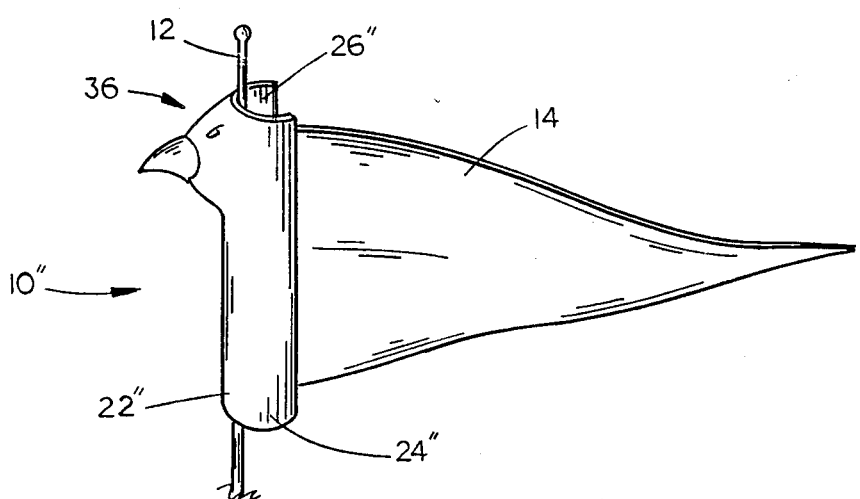
FIG. 5 is a perspective view of a third embodiment of the present invention mounted on a vehicle aerial.

Referring now to FIG. 5, a third embodiment of the present invention is designated generally at 10" and includes a forwardmost portion 22", diverging side walls 24" and 26", and is fastened to an aerial 12. In this embodiment of the invention, a bust of a mascot of a college or professional sport team, is formed on forwardmost portion 22, as indicated generally at 36. A pennant 14, preferably imprinted with indicia related to bust 36, is attached to the aerial in conjunction with deflector 10".

Whereas the invention has been shown and described in connection with the preferred embodiments thereof, it will understood that many modifications, substitutions and additions may be made which are within the intended broad scope of the intended claims. For example, the cross-sectional shape of the wind deflector may be "V"-shaped as shown in FIGS. 2 and 3, or have any other aerodynamic wind deflecting shape, such as the generally arcuate shape shown in FIG. 5. Likewise, many different methods for removably attaching the wind deflector to an aerial may be utilized.

It is therefore believed that the present invention fulfills at least all of the above stated objectives.

I claim:

1. In combination:

a cylindrical vehicle aerial projecting vertically from a vehicle;

a generally planar pennant having forward and rearward ends;

said pennant having its forward end wrapped around a portion of said aerial such that said pennant is positioned in a vertical plane extending horizontally;

a wind reflector removably mounted on said aerial on the forward end of said pennant, so as to removably hold said pennant on said aerial;

said wind deflector including a vertically-oriented elongated body having upper and lower ends and a forward portion and rearward portion;

said deflector body including a pair of walls diverging rearwardly;

resilient rubber bracket means mounted on the rearward portion of said deflector and extending longitudinally along said body, said bracket means having a longitudinal slot therein adatped to snap-fit onto said aerial;

said deflector having a vertical length at least as great as the vertical height of said pennant;

said deflector walls located so as to deflect wind around the forward end of said pennant.

2. In combination:

a cylindrical vehicle aerial projecting vertically from a vehicle;

a generally planar pennant having forward and rearward ends;

said pennant having its forward end wrapped around a portion of said aerial such that said pennant is positioned in a vertical plane extending horizontally;

a wind deflector removably mounted on said aerial on the forward end of said pennant, so as to removably hold said pennant on said aerial;

said wind reflector including a vertically-oriented elongated body having upper and lower ends and a forward portion and rearward portion;

said deflector body including a pair of walls diverging rearwardly;

a plurality of vertically spaced-apart bracket means, each said bracket means having an aperture therein adapted to receive said aerial, said bracket means being formed of a resilient plastic material adapted to snap-fit onto said aerial, said deflector having a vertical length at least as great as the vertical height of said pennant;

said deflector walls located so as to deflect wind around the forward end of said pennant.

3. The combination of claim 1, wherein said walls diverge arcuately rearwardly, and further comprising an animal bust formed in the forward portion of said deflector, projecting forwardly.

4. The combination of claim 2, wherein said walls diverge arcuately rearwardly, and further comprising an animal bust formed in the forward portion of said deflector, projecting forwardly.

* * * * *